(12) United States Patent
Oketani (10) Patent No.: US 11,637,461 B2
(45) Date of Patent: Apr. 25, 2023

(54) STATOR, MOTOR, FAN, VACUUM CLEANER, AND WINDING METHOD

(71) Applicant: Mitsubishi Electric Corporation, Tokyo (JP)

(72) Inventor: Naohiro Oketani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1047 days.

(21) Appl. No.: 16/094,767

(22) PCT Filed: Jul. 14, 2016

(86) PCT No.: PCT/JP2016/070871
§ 371 (c)(1),
(2) Date: Oct. 18, 2018

(87) PCT Pub. No.: WO2018/011950
PCT Pub. Date: Jan. 18, 2018

(65) Prior Publication Data
US 2019/0131828 A1 May 2, 2019

(51) Int. Cl.
*H02K 1/14* (2006.01)
*A47L 5/24* (2006.01)
(Continued)

(52) U.S. Cl.
CPC ............. *H02K 1/148* (2013.01); *A47L 5/24* (2013.01); *A47L 9/00* (2013.01); *A47L 9/22* (2013.01);
(Continued)

(58) Field of Classification Search
CPC ........ H02K 1/148; H02K 1/2733; H02K 3/18; H02K 3/325; H02K 5/15; H02K 7/14;
(Continued)

(56) References Cited

U.S. PATENT DOCUMENTS 5,986,377 A * 11/1999 Yamada ................. H02K 15/06
310/216.013
7,348,706 B2 * 3/2008 Ionel ....................... H02K 1/148
310/216.137
(Continued)

FOREIGN PATENT DOCUMENTS

CN 203180735 U 9/2013
CN 103647421 A 3/2014
(Continued)

OTHER PUBLICATIONS

Office Action dated Mar. 25, 2022 issued in corresponding CN patent application No. 201680087111.8 (and English translation).
(Continued)

*Primary Examiner* — Burton S Mullins
(74) *Attorney, Agent, or Firm* — Posz Law Group, PLC (57) ABSTRACT

A stator includes a yoke extending in a circumferential direction about an axis line, a tooth extending from the yoke in a first direction toward the axis line, and a coil wound around and fixed to the tooth. The yoke has an inner wall surface facing the axis line. The tooth has a root part connected to the yoke. The inner wall surface of the yoke is a flat surface extending from an end of the root part of the tooth in the circumferential direction to an inner circumferential side relative to a plane passing through the end and perpendicular to the first direction.

10 Claims, 11 Drawing Sheets

(51) Int. Cl.
| | |
|---|---|
| *A47L 9/00* | (2006.01) |
| *H02K 1/27* | (2022.01) |
| *H02K 3/18* | (2006.01) |
| *H02K 7/14* | (2006.01) |
| *H02K 21/16* | (2006.01) |
| *H02K 1/2733* | (2022.01) |
| *A47L 9/22* | (2006.01) |
| *H02K 5/15* | (2006.01) |
| *H02K 3/32* | (2006.01) |
| *H02K 15/02* | (2006.01) |
| *H02K 15/095* | (2006.01) |
| *H02K 15/10* | (2006.01) |
| *H02K 5/173* | (2006.01) |

(52) U.S. Cl.
CPC ............ *H02K 1/2733* (2013.01); *H02K 3/18* (2013.01); *H02K 3/325* (2013.01); *H02K 5/15* (2013.01); *H02K 7/14* (2013.01); *H02K 15/022* (2013.01); *H02K 15/095* (2013.01); *H02K 15/10* (2013.01); *H02K 21/16* (2013.01); *H02K 5/1732* (2013.01)

(58) Field of Classification Search
CPC .... H02K 15/022; H02K 15/095; H02K 15/10; H02K 21/16; A47L 5/24; A47L 9/00; A47L 9/22
See application file for complete search history.

(56) References Cited

U.S. PATENT DOCUMENTS

| | | | |
|---|---|---|---|
| 8,847,461 B2 * | 9/2014 | Sawada .................. | H02K 1/148 310/216.097 |
| 2002/0008434 A1 | 1/2002 | Akutsu et al. | |
| 2004/0124734 A1 | 7/2004 | Liao | |
| 2015/0084444 A1 | 3/2015 | Yabe et al. | |
| 2018/0226867 A1 | 8/2018 | Hattori | |

FOREIGN PATENT DOCUMENTS

| | | |
|---|---|---|
| CN | 103891100 A | 6/2014 |
| JP | S61-227648 A | 10/1986 |
| JP | H10-174335 A | 6/1998 |
| JP | H11-262203 A | 9/1999 |
| JP | 2000-175386 A | 6/2000 |
| JP | 2000-184631 A | 6/2000 |
| JP | 2002-044913 A | 2/2002 |
| JP | 2003-032923 A | 1/2003 |
| JP | 2003-180044 A | 6/2003 |
| JP | 2004-088960 A | 3/2004 |
| JP | 2004-215476 A | 7/2004 |
| JP | 2006-325309 A | 11/2006 |
| JP | 2007-151243 A | 6/2007 |
| JP | 2009-153291 A | 7/2009 |
| JP | 2013-021784 A | 1/2013 |
| JP | 2015-213414 A | 11/2015 |
| JP | 2016-046880 A | 4/2016 |

OTHER PUBLICATIONS

Office Action dated May 6, 2021, issued in corresponding CN Patent Application No. 201680087111.8 (and English Machine Translation).
Office Action dated Sep. 3, 2019 issued in corresponding JP patent application No. 2018-527339 (and English translation).
International Search Report of the International Searching Authority dated Aug. 9, 2016 for the corresponding International application No. PCT/JP2016/070871 (and English translation).
Office Action dated Aug. 31, 2021, issued in corresponding CN Patent Application No. 201680087111.8 (and English Machine Translation).
Office Action dated Jan. 2, 2020 issued in corresponding CN patent application No. 201680087111.8 (and English translation).
Office Action dated May 28, 2019 issued in corresponding JP patent application No. 2018-527339 (and English translation).
Office Action dated Oct. 10, 2020 issued in corresponding CN patent application 201680087111.8 (and English machine translation).
Notice of Retrial dated Nov. 11, 2022 in corresponding CN Patent Application No. 201680087111.8 (with English translation).
Zhicheng Wang, "Numerical Control Principle and Numerical Control System," National Security Industry Press, Jan. 2007, 1st Edition, 1st Press, ISBN 7-118-04910-7, pp. 69-71. (with concise English explanation of relevance).
Retrial Decision dated Jan. 11, 2023 in connection with counterpart Chinese Patent Application No. 201680087111.8 (and English machine translation).

* cited by examiner

STATOR, MOTOR, FAN, VACUUM CLEANER, AND WINDING METHOD

CROSS REFERENCE TO RELATED APPLICATION

This application is a U.S. national stage application of International Patent Application No. PCT/JP2016/070871 filed on Jul. 14, 2016, the disclosure of which is incorporated herein by reference.

TECHNICAL FIELD

The present invention relates to a stator, a motor, a fan, a vacuum cleaner, and a winding method

BACKGROUND ART

Conventionally, there is known a motor of an inner rotor type made by attaching a permanent magnet to a rotor on an inner side and attaching a coil to a stator on an outer side. In order to wind the coil around the stator at high density, it is desirable to wind the coil regularly (regular winding).

For this reason, a stator made by connecting a plurality of split cores, each including a core piece in an arc-like shape and a tooth, is disclosed in Patent Reference 1, for example. A coil is wound around each tooth in a state where the split cores are expanded in a band shape, and thereafter the split cores are combined into an annular shape so that the stator is obtained.

PATENT REFERENCE

Patent Reference 1: Japanese Patent Application Publication No. 2000-184631 (see FIG. 1)

However, since it is necessary to provide a space for arranging the coil inside the stator, there is a problem that it is difficult to reduce a distance from a center to an outer circumference of the motor, that is, a distance from a rotation center of a rotor to an outer circumference of the stator.

SUMMARY

The present invention is made to solve the above described problem, and an object of the present invention is to provide a stator capable of providing a space for arranging a coil and capable of being downsized.

A stator according to the present invention includes a yoke extending in a circumferential direction about an axis line, a tooth extending from the yoke in a first direction toward the axis line, and a coil wound around and fixed to the tooth. The yoke has an inner wall surface facing the axis line. The tooth has a root part connected to the yoke. The inner wall surface of the yoke is a flat surface extending from an end of the root part of the tooth in the circumferential direction to an inner circumferential side relative to a plane passing through the end and perpendicular to the first direction.

A winding method according to the present invention includes a step of preparing a stator core having a yoke extending in a circumferential direction about an axis line and a tooth extending from the yoke in a first direction toward the axis line, and a step of winding a plurality of layers of a coil around the tooth by repeating a step of winding one layer of the coil around the tooth and a step of securing the wound one layer of the coil.

According to the present invention, a stator capable of providing a space for arranging a coil and capable of being downsized can be provided.

DETAILED DESCRIPTION

First Embodiment (Configuration of Motor)

Figure 1:
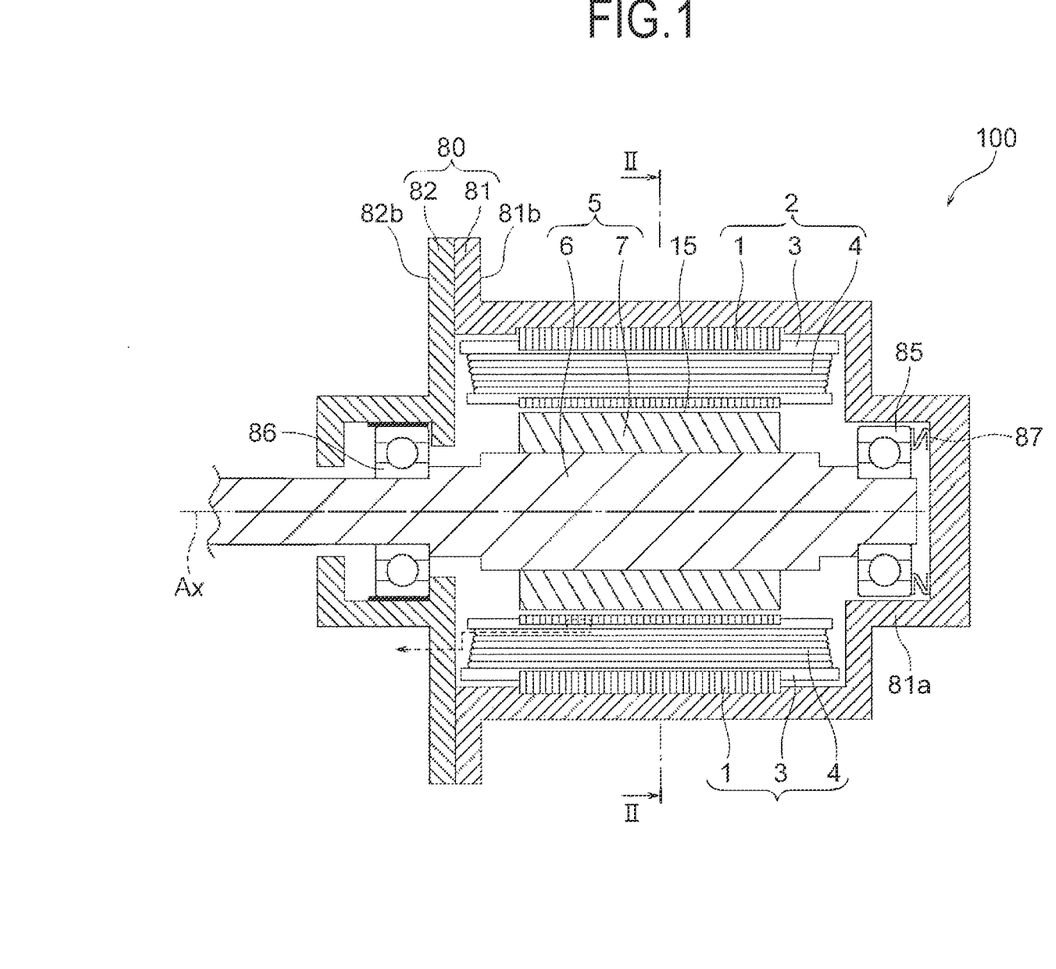
FIG. 1 is a longitudinal sectional view showing a configuration of a motor in a first embodiment.

First, a motor according to a first embodiment of the present invention will be described. FIG. 1 is a longitudinal sectional view showing a configuration of a motor 100 in the first embodiment. The motor 100 in the first embodiment is a brushless DC motor, for example.

The motor 100 includes a rotor 5, a stator 2 in an annular shape arranged around the rotor 5, a frame (housing) 80 in which the stator 2 is housed, bearings 85 and 86, and a spring 87.

The frame 80 is divided in the direction of a rotation axis (an axis line Ax) of the rotor 5 into a first frame part 81 and a second frame part 82. The first frame part 81 has a cylindrical shape, and the stator 2 is inserted in the first frame part 81. The first frame part 81 has a bearing holding part 81a at an end in an axial direction. The bearing 85 is mounted in the bearing holding part 81a. Further, the first frame part 81 has a flange part 81b at an end on the second frame part 82 side.

The bearing 86 is mounted in the second frame part 82, and the second frame part 82 has a flange part 82b at an end on the first frame part 81 side. The flange parts 81b and 82b of the first frame part 81 and the second frame part 82 are fixed to each other by means of adhesion, screw fastening or welding.

The bearings 85 and 86 rotatably support a shaft 6 of the rotor 5. The shaft 6 penetrates the second frame part 82 in the axial direction and projects outside. For example, an impeller 91 (FIG. 11) is attached to a tip end of the shaft 6.

The spring 87 for applying pressure in the axial direction to the bearing 85 is arranged between the bearing 85 and the bearing holding part 81a of the first frame part 81. The spring 87 is formed of a wave washer or the like, for example.

In the following description, a direction of the axis line Ax as the rotation axis of the rotor 5 (i.e., a center axis of the shaft 6) will be referred to as an "axial direction". Further, a rotational circumferential direction about the axis line Ax (i.e., a direction along an outer circumference of the rotor 5 or the stator 2) will be referred to as a "circumferential direction". Furthermore, a rotational radial direction about the axis line Ax (i.e., a radial direction of the rotor 5 or the stator 2) will be referred to as a "radial direction".

Figure 2:
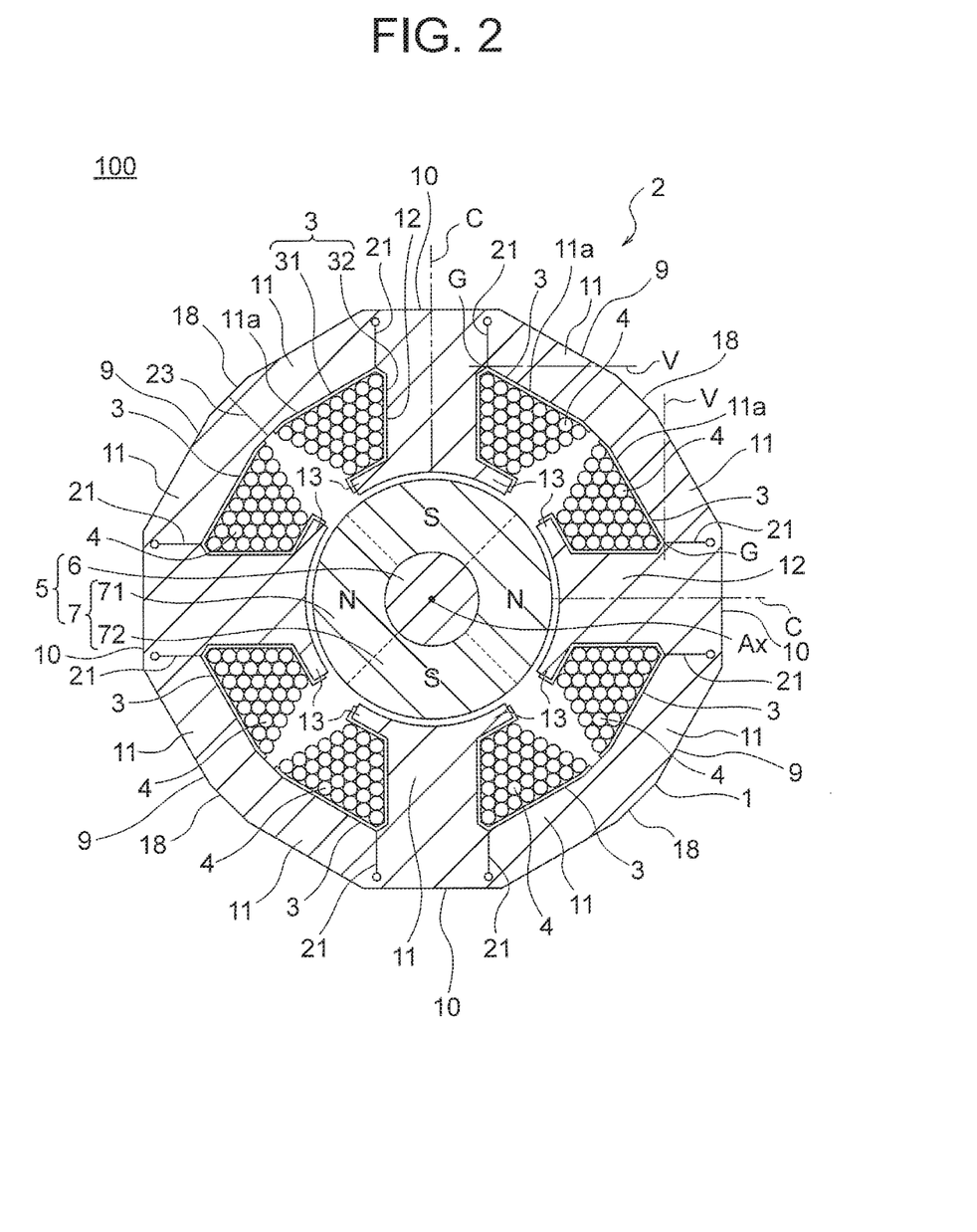
FIG. 2 is a cross-sectional view showing the configuration of the motor in the first embodiment.

FIG. 2 is a cross-sectional view showing the configuration of the motor 100 in the first embodiment. FIG. 2 corresponds to a cross-sectional view at a line segment II-II in FIG. 1 viewed in a direction of arrows. Incidentally, the frame 80 (FIG. 1) is omitted in FIG. 2.

As shown in FIG. 2, the rotor 5 includes the shaft 6 and a permanent magnet 7 provided on an outer circumferential side of the shaft 6. The permanent magnet 7 includes two arc-shaped magnet parts 71 and two arc-shaped magnet parts 72, and is formed in an annular shape as a whole. Thus, the number of permanent magnets 7 (i.e., the number of poles) is four. The permanent magnet 7 (the magnet parts 71 and 72) is fixed to an outer circumferential surface of the shaft 6 by means of adhesion or the like.

Each magnet part 71 is magnetized so that its outer circumferential surface serves as a north pole. Each magnet part 72 is magnetized so that its outer circumferential surface serves as a south pole. A boundary between adjacent magnet parts 71 and 72 of the permanent magnet 7 is an inter-pole part.

Incidentally, the configuration of the rotor 5 is not limited to the example described above. For example, the rotor 5 may also be configured by attaching plate-like or semi-cylindrical permanent magnets to an outer circumferential surface or magnet insertion holes of the rotor core. Further, the shaft 6 is not limited to one having a circular cross section, and a part of the shaft 6 to which the permanent magnet 7 is attached may have a polygonal cross section.

Figure 3:
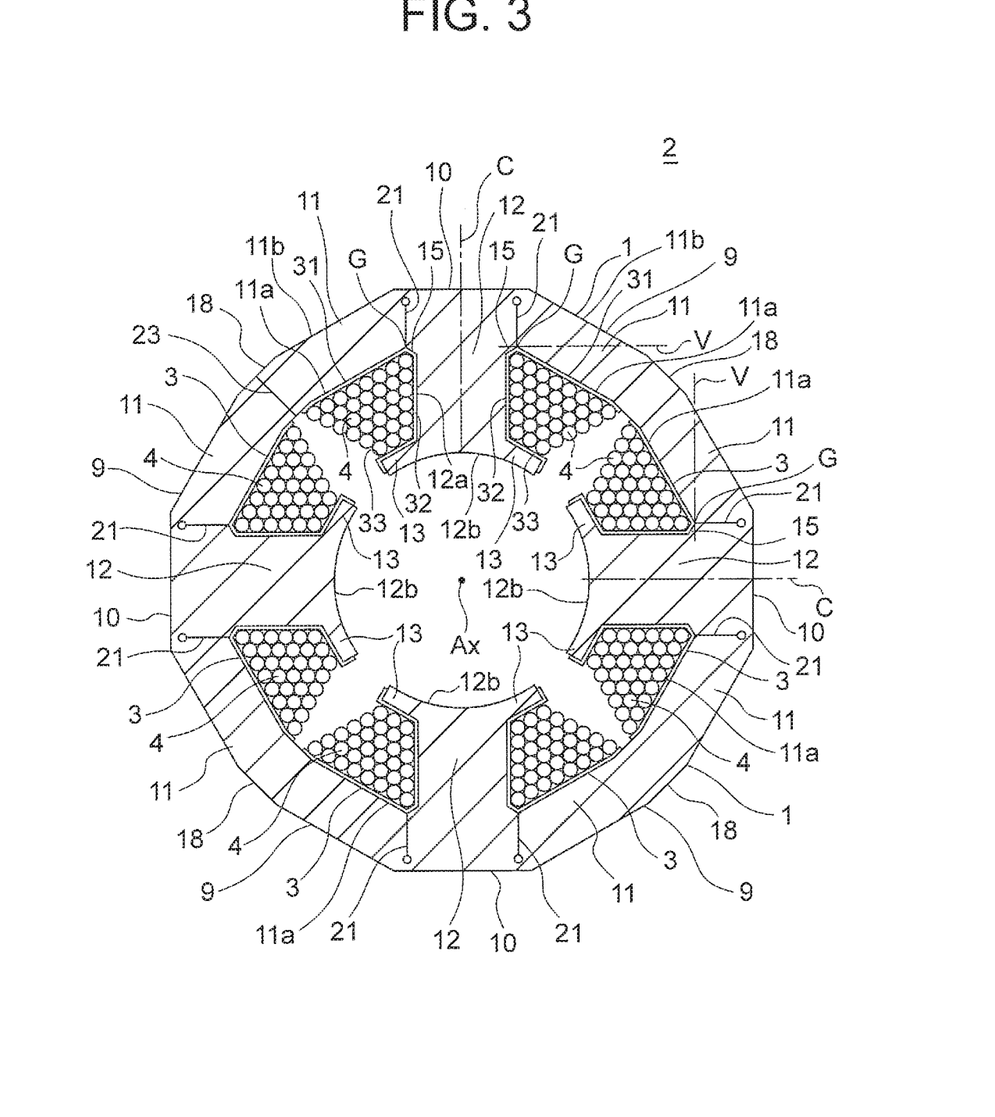
FIG. 3 is a cross-sectional view showing a configuration of a stator in the first embodiment.

FIG. 3 is a cross-sectional view showing a configuration of the stator 2. The stator 2 includes a stator core 1, an insulator 3 provided on the stator core 1, and a coil 4 (winding) wound around the stator core 1 via the insulator 3.

Figure 5A:
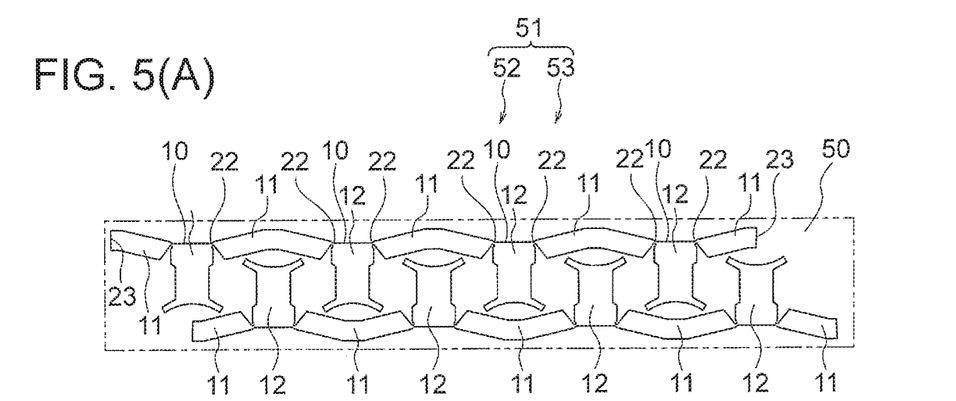
FIGS. 5(A), 5(B) and 5(C) are a plan view and cross-sectional views for explaining a manufacturing process of the motor in the first embodiment.

The stator core 1 is formed by punching a plurality of electromagnetic steel sheets 50 (FIG. 5(A)) each having a thickness of 0.1 to 0.7 mm, stacking the punched electromagnetic steel sheets 50 in the axial direction, and securing the electromagnetic steel sheets 50 together by means of crimping or the like. This point will be described later.

The stator core 1 includes a yoke 9 in an annular shape about the axis line Ax that is the rotation axis of the rotor 5 (the center axis of the shaft 6) and four teeth 12 each of which extends from the yoke 9 in a direction toward the axis line Ax (the first direction). The four teeth 12 are arranged at equal intervals in the circumferential direction about the axis line Ax. A slot is formed between teeth 12 adjacent to each other in the circumferential direction.

Each tooth 12 has a winding surface including a pair of side surfaces 12a, which are both end surfaces in the circumferential direction, and both end surfaces (not shown) in the axial direction. The coil 4 is wound around this winding surface. A center line C of each tooth 12 is a straight line in the radial direction passing through the above described axis line Ax. Each side surface 12a of the tooth 12 is a flat surface parallel to the center line C.

An inner circumferential surface 12b in an arc-like shape is formed at a tip end of the tooth 12 on an inner side in the radial direction, and the inner circumferential surface 12b faces an outer circumferential surface of the rotor 5 (FIG. 2). Further, a flange part 13 projecting toward both sides in the circumferential direction is formed at the tip end of the tooth 12.

The yoke 9 includes first yoke parts 10 each connected to the tooth 12 and second yoke parts 11 adjacent to the first yoke parts 10 in the circumferential direction. Four first yoke parts 10 and four second yoke parts 11 are arranged alternately in the circumferential direction.

Further, the yoke 9 has split surfaces 21 at positions where each tooth 12 is sandwiched between two of the split surfaces 21 from both sides in the circumferential direction. Since the number of the teeth 12 is four, eight split surfaces 21 are provided. Each split surface 21 of the yoke 9 is formed between a center of the first yoke part 10 in the circumferential direction (the center line C of the tooth 12) and a center of the second yoke part 11 in the circumferential direction. In this example, each split surface 21 of the yoke 9 is formed at a boundary between the first yoke part 10 and the second yoke part 11.

In addition, a joint surface 23 is formed at an end in the circumferential direction of one of the four second yoke parts 11 of the yoke 9 (the second yoke part 11 located on the upper left in FIG. 3). This joint surface 23 is made of end surfaces (abutting parts) that are welded together when split cores (explained later) expanded in a band shape are combined into the stator core 1.

In this example, the joint surface 23 is formed at a center of one second yoke part 11 in the circumferential direction in order to inhibit damage to an insulation coating of the coil 4 caused by heat at the time of welding. As will be explained later, the abutting parts of the split cores are abutted against each other and welded to a predetermined depth in bead-like form or at some points.

Figure 4:
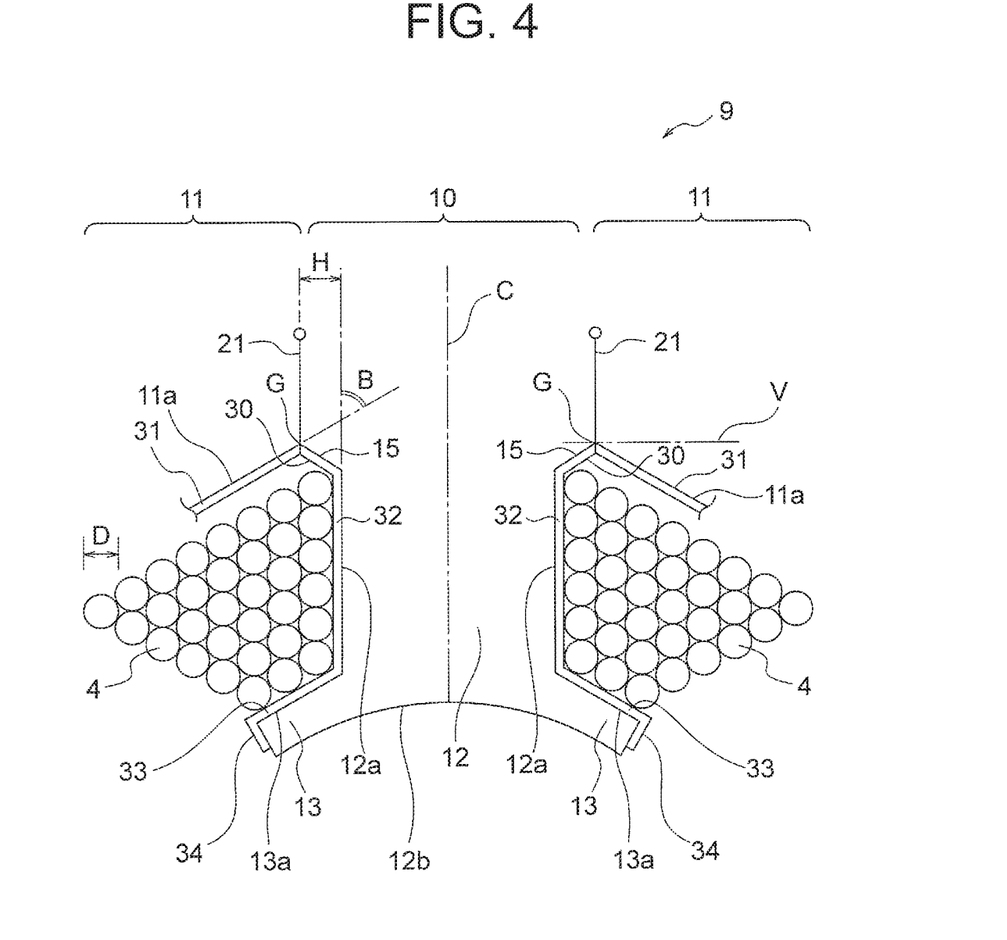
FIG. 4 is an enlarged view showing a part around a tooth in the stator in the first embodiment.

FIG. 4 is an enlarged view showing the tooth 12 of the stator core 1 and the vicinity of the tooth 12. As described above, the yoke 9 includes the first yoke parts 10 and the second yoke parts 11 and the teeth 12 extend inward in the radial direction (direction toward the axis line Ax) from first yoke parts 10.

The tooth 12 has an inclined surface 15 on each side of its root part (part connected to the first yoke part 10) in the circumferential direction. The inclined surface 15 is inclined so that its distance from the axis line Ax increases with increase in distance from the side surface 12a of the tooth 12 in the circumferential direction.

The second yoke part 11 has an inner wall surface 11a on an inner circumferential side (i.e., a side facing the axis line Ax) and an outer wall surface 11b (FIG. 3) on an outer circumferential side (i.e., a side opposite to the axis line Ax). Both of the inner wall surface 11a and the outer wall surface 11b are flat surfaces.

The inner wall surface 11a of the second yoke part 11 extends linearly from an end G of the root part of the tooth 12 in the circumferential direction in a plane perpendicular to the axis line Ax. In this example, the split surface 21 of the yoke 9 is arranged at a boundary between the inner wall surface 11a of the second yoke part 11 and the inclined surface 15 of the tooth 12.

Specifically, the inner wall surface 11a of the second yoke part 11 is a flat surface extending from the end G in the circumferential direction of the root part of the tooth 12, and extending inward in the radial direction (to the axis line Ax side) relative to a plane V passing through the end G and perpendicular to the center line C. The outer wall surface 11b of the second yoke part 11 is a flat surface extending in parallel with the inner wall surface 11a.

With this configuration, a distance from the axis line Ax to the outer circumference (the outer wall surface 11b) of the second yoke part 11 can be reduced as compared with a case where the inner wall surface 11a and the outer wall surface 11b (FIG. 3) of the second yoke part 11 are cylindrical surfaces about the axis line Ax.

An angle B formed by the inner wall surface 11a of the second yoke part 11 and the side surface 12a of the tooth 12 (parallel to the center line C) is 60 degrees, for example. However, the angle B is not limited to 60 degrees, and it is sufficient that the angle B is less than 90 degrees.

As shown in FIG. 3, a flat surface 18 is formed at a center of the outer wall surface 11b of the second yoke part 11 in the circumferential direction, and the flat surface 18 extends along the circumferential direction about the axis line Ax and forms an angle of 45 degrees with respect to the above described plane V. By forming this flat surface 18, the distance from the axis line Ax to the outer circumference of the second yoke part 11 can be reduced further.

As shown in FIG. 4, an inclined surface 13a facing the inner wall surface 11a of the second yoke part 11 is formed on the flange part 13 at the tip end of the tooth 12. The inclined surface 13a is a flat surface and is formed in parallel with the inner wall surface 11a of the second yoke part 11.

A region surrounded by the inner wall surface 11a of the second yoke part 11, the inclined surface 15 of the tooth 12, the side surface 12a of the tooth 12 and the inclined surface 13a of the flange part 13 is a region in which the coil 4 wound around the tooth 12 is arranged.

When the coil 4 is wound around the tooth 12, the inclined surface 15 of the tooth 12 and the inclined surface 13a of the flange part 13 described above respectively make contact with end parts of a first layer of the coil 4 on the outer circumferential side and the inner circumferential side, and thus displacement of the coil 4 is prevented. In other words, the inclined surface 15 of the tooth 12 and the inclined surface 13a of the flange part 13 function as stoppers when the coil 4 is wound around the tooth 12.

A distance H from the side surface 12a of the tooth 12 to the split surface 21 in the circumferential direction is desired to be within a range of 0.5 times to 1.5 times a diameter of the coil 4, i.e., a wire diameter D. If the distance H is within this range, the first layer of the coil 4 can be properly guided so as to prevent displacement when a plurality of layers of the coil 4 are wound around the tooth 12, and a sufficient space for winding work can be provided on both sides of the tooth 12 in the circumferential direction.

The coil 4 is wound at high density in a trefoil shape, for example. Winding in a trefoil shape means a winding method in which a coil part (wire) of an upper-side layer of the coil 4 is placed in a concave part between two adjacent coil parts (wires) of a lower-side layer of the coil 4.

An angle B formed by the inner wall surface 11a of the second yoke part 11 and the side surface 12a of the tooth 12 (parallel to the center line C) is, most preferably, 60 degrees. When the angle B is 60 degrees, the inner wall surface 11a of the second yoke part 11 is a flat surface extending along an envelope of the coil 4 wound around the tooth 12. With this configuration, a larger amount of coil 4 can be wound around the stator 2 having a smaller outer diameter.

Since the coil 4 can be wound at high density as described above, it is possible to increase a ratio of a cross-sectional area of the coil 4 to a cross-sectional area of the slot (a winding space factor) and thereby reduce copper loss.

The insulator 3 is provided so as to cover parts of the yoke 9 and the tooth 12 of the stator core 1, i.e., a part around which the coil 4 is wound and a part which faces the coil 4, and electrically insulates the coil 4 and the stator core 1 from each other.

Specifically, the insulator 3 includes inclined surface parts 30 covering the inclined surfaces 15 of the tooth 12, inner wall surface parts 31 covering the inner wall surfaces 11a of the second yoke parts 11, winding surface parts 32 covering the side surfaces 12a of the tooth 12 and both end surfaces of the tooth 12 in the axial direction (i.e., surfaces around which the coil 4 is wound), inclined surface parts 33 covering the inclined surfaces 13a of the flange part 13, and flange end surface parts 34 covering end surfaces of the flange part 13 in the circumferential direction. The inclined surface part 30 and the inner wall surface part 31 are adjacent to each other in the circumferential direction across the split surface 21.

The insulator 3 is formed of insulating material. More specifically, the insulator 3 is formed of resin such as PPS (polyphenylene sulfide) or PET (polyethylene terephthalate), for example.

The insulator 3 can be formed integrally with the stator core 1 by setting the stator core 1 in a mold and filling the mold with resin. Alternatively, it is also possible to fit previously formed resin molded bodies onto the stator core 1.

In the case of the resin molded bodies, the inclined surface parts 30, the winding surface parts 32, the inclined surface parts 33 and the flange end surface parts 34 of the insulator 3 (i.e., parts other than the inner wall surface parts 31 provided on the second yoke parts 11) may be formed integrally.

(Manufacturing Method of Motor)

Figure 5B:
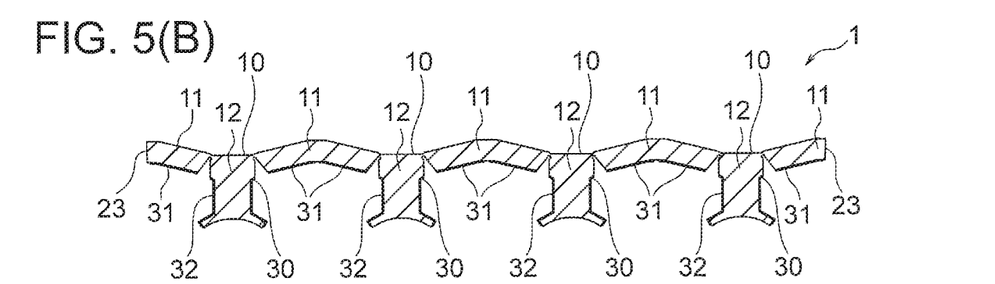
Figure 5C:
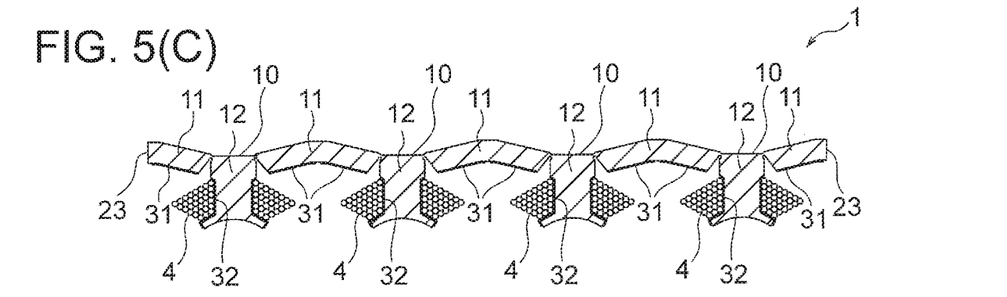

Next, a manufacturing method of the motor 100 will be described. FIG. 5(A) is a plan view for explaining a manufacturing process of the motor 100. FIGS. 5(B) and 5(C) are cross-sectional views for explaining the manufacturing process of the motor 100.

First, as shown in FIG. 5(A), an electromagnetic steel sheet 50 is punched into a shape in which a plurality of split cores 51 are connected together in a band shape. In this example, the split cores 51 include four split cores 52 each formed of the tooth 12 and the first yoke part 10 and four split cores 53 each formed of the second yoke part 11. The split cores 52 and the split cores 53 are alternately connected together in the band shape to form a split core array. Both ends of the split core array are made by dividing one split core 53 formed of the second yoke part 11 into two.

A thin-wall part 22 is formed between adjacent split cores 51, that is, between the first yoke part 10 (the split core 52) and the second yoke part 11 (the split core 53). The thin-wall part 22 is formed at a position between the first yoke part 10 and the second yoke part 11 and in an edge part on the outer circumferential side. The thin-wall part 22 deforms plastically when the split cores 51 are connected together into an annular shape (FIGS. 7(A) and 7(B) which will be explained later).

In FIG. 5(A), in order to punch as many split core arrays as possible out of the electromagnetic steel sheet 50, two split core arrays are punched in such a manner that the teeth 12 in one array face the second yoke parts 11 in the other array. However, the punching pattern of the electromagnetic steel sheet 50 is not limited to this example.

A plurality of punched electromagnetic steel sheets 50 are stacked in the axial direction and are secured together by means of crimping, welding, adhesion or the like, so that the stator core 1 shown in FIG. 5(B) is formed. At this stage, the split cores 51 constituting the stator core 1 are not connected in the annular shape but are expanded in the band shape (linearly).

Subsequently, the insulator 3 is formed on the yoke 9 (the first yoke parts 10 and the second yoke parts 11) and the teeth 12 of the stator core 1. As described above, the insulator 3 is formed integrally with the stator core 1 by setting the stator core 1 in a mold and filling the mold with resin, or formed by fitting previously formed resin molded bodies onto the stator core 1.

The inclined surface part 30 of the insulator 3 is formed to cover the inclined surface 15 (FIG. 4) of the root part of the tooth 12, and the inner wall surface part 31 is formed to cover the inner wall surface 11a (FIG. 4) of the second yoke part 11. The winding surface part 32 is formed to cover the winding surface of the tooth 12. The inclined surface part 33 (FIG. 4) of the insulator 3 is formed to cover the inclined surface 13a of the flange part 13, and the flange end surface part 34 (FIG. 4) is formed to cover the end surface of the flange part 13 in the circumferential direction.

Subsequently, as shown in FIG. 5(C), the coil 4 is wound around and fixed to the insulator 3 (more specifically, the winding surface part 32) around each tooth 12. In short, the winding work of the coil 4 is carried out. Since the stator core 1 is expanded in the band shape, there are sufficient spaces on both sides of each tooth 12, and the winding process of the coil 4 can be carried out easily.

Figure 6A:
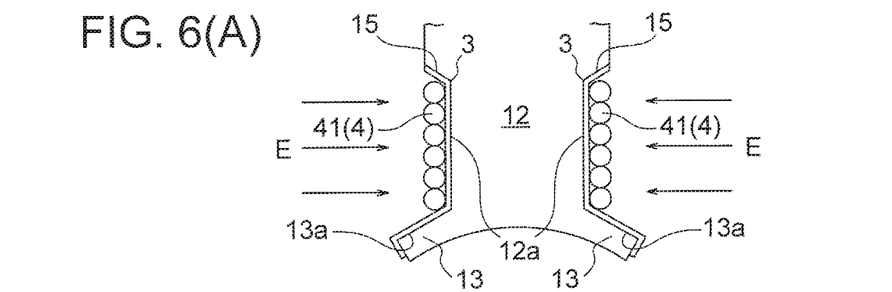
FIGS. 6(A), 6(B), 6(C) and 6(D) are cross-sectional views for explaining a winding process in the first embodiment.

FIGS. 6(A), 6(B), 6(C) and 6(D) are schematic views for explaining the winding process of the coil 4 shown in FIG. 5(C). First, as shown in FIG. 6(A), a first layer of the coil 4 (referred to as a first layer 41) is closely wound on the insulator 3 around the tooth 12.

The winding of the first layer 41 of the coil 4 is started at a position where the first layer 41 is in contact with the inclined surface 15 of the tooth 12, for example. A tail end of the first layer 41 of the coil 4 is in contact with the inclined surface 13a of the flange part 13. Since the first layer 41 of the coil 4 is guided from both sides by the inclined surface 15 of the tooth 12 and the inclined surface 13a of the flange part 13 as described above, the displacement of the first layer 41 of the coil 4 can be prevented.

After winding the first layer 41 of the coil 4, an ultraviolet-curable adhesive agent is applied to (for example, dropped onto) the first layer 41 of the coil 4, and further the adhesive agent is irradiated with ultraviolet rays as indicated by arrows E. The adhesive agent is cured by the ultraviolet irradiation and the first layer 41 of the coil 4 is secured to the insulator 3 around the tooth 12. Further, adjacent coil parts (wires) of the first layer 41 of the coil 4 are also secured to each other.

Figure 6B:
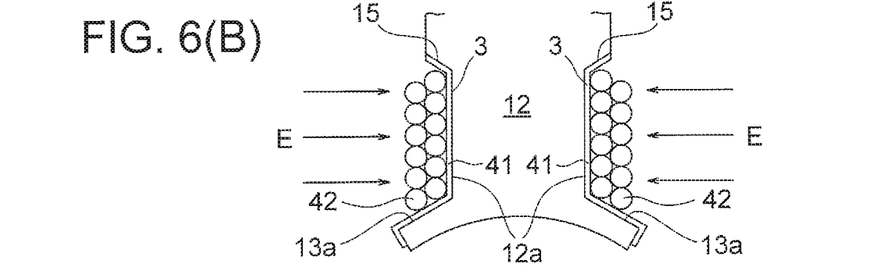

Subsequently, as shown in FIG. 6(B), a second layer of the coil 4 (referred to as a second layer 42) is wound on the first layer 41 of the coil 4. In this step, winding is carried out in the above described trefoil shape, that is, in such a manner that each coil part (wire) of the second layer 42 of the coil 4 enters the concave part between two adjacent coil parts of the first layer 41 of the coil 4.

Since the first layer 41 of the coil 4 is positioned by the inclined surface 15 of the tooth 12 or the like as described above, the second layer 42 of the coil 4 can be placed on the first layer 41 of the coil 4 in a stable condition. Incidentally, the second layer 42 of the coil 4 does not contact the inclined surface 15 of the tooth 12 but contacts the inclined surface 13a of the flange part 13.

After winding the second layer 42 of the coil 4, the ultraviolet-curable adhesive agent is applied, and further the adhesive agent is irradiated with ultraviolet rays as indicated by arrows E. The adhesive agent is cured by the ultraviolet irradiation and the second layer 42 of the coil 4 is secured to the first layer 41 of the coil 4. Further, adjacent coil parts (wires) of the second layer 42 of the coil 4 are also secured to each other.

Figure 6C:
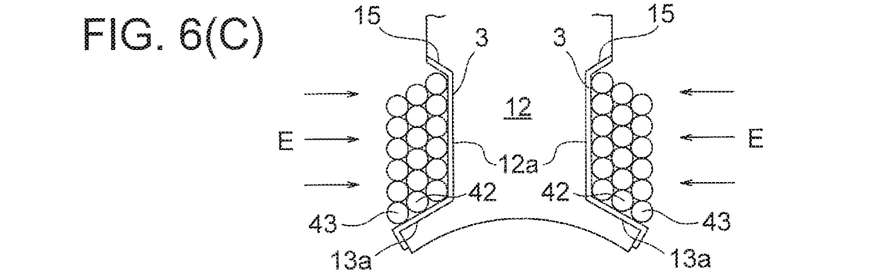

Subsequently, as shown in FIG. 6(C), a third layer of the coil 4 (referred to as a third layer 43) is wound on the second layer 42 of the coil 4 in the trefoil shape. After winding the third layer 43 of the coil 4, the ultraviolet-curable adhesive agent is applied, and further the adhesive agent is irradiated with ultraviolet rays as indicated by arrows E. The adhesive agent is cured by the ultraviolet irradiation and the third layer 43 of the coil 4 is secured to the second layer 42 of the coil 4. Further, adjacent coil parts of the third layer 43 of the coil 4 are also secured to each other.

Figure 6D:
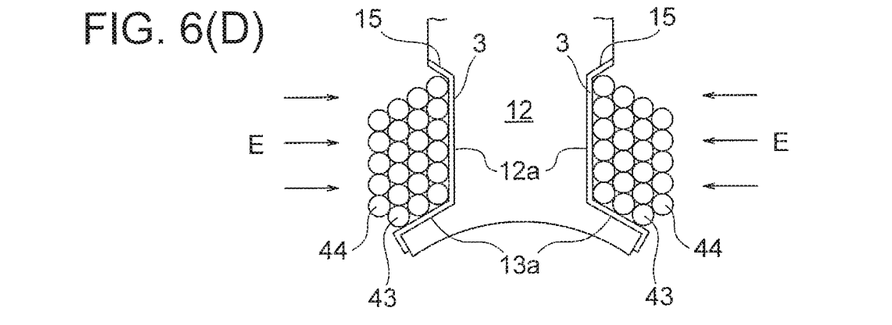

Subsequently, as shown in FIG. 6(D), a fourth layer of the coil 4 (referred to as a fourth layer 44) is wound on the third layer 43 of the coil 4 in the trefoil shape. Since the fourth layer 44 of the coil 4 is not guided by the inclined surface 13a of the flange part 13, the winding of the fourth layer 44 of the coil 4 is carried out for a smaller number of turns than the third layer 43. After winding the fourth layer 44 of the coil 4, the ultraviolet-curable adhesive agent is applied, and further the adhesive agent is irradiated with ultraviolet rays as indicated by arrows E. The adhesive agent is cured by the ultraviolet irradiation and the fourth layer 44 of the coil 4 is secured to the third layer 43 of the coil 4. Further, adjacent coil parts of the fourth layer 44 of the coil 4 are also secured to each other.

Thereafter, winding of a fifth layer to a preset number of the coil 4 is carried out (see FIG. 4), and the ultraviolet irradiation is carried out each time one layer of the coil 4 is wound. Specifically, the winding of the coil 4, the application of the adhesive agent, and the ultraviolet irradiation are repeatedly carried out each time one layer of the coil 4 is wound. Regarding the fourth layer 44 and its subsequent layers, the number of turns per layer is decremented by one each time one layer of the coil 4 is wound.

Since the coil 4 is secured each time one layer of the coil 4 is wound as above, the coil 4 does not collapse during the winding work, and the coil 4 can be wound regularly at high density as shown in FIG. 4. Incidentally, while FIGS. 2 to 4 show that the number of winding layers of the coil 4 is eight for convenience of illustration, the number of layers of the coil 4 is not limited to this example.

Further, since the inclined surface 15 of the tooth 12 and the inclined surface 13a of the flange part 13 function as stoppers (contact surfaces) for the coil 4 (FIG. 6(A)) as described above, the displacement of the coil 4 can be inhibited during the winding process and even after the winding. Accordingly, productivity can be enhanced and manufacturing cost can be reduced.

Incidentally, it is desirable to wind the coil 4 while applying appropriate tension to the coil 4. This is because excessively high tension may cause the coil 4 to be stretched and deteriorate an insulation coating on the surface of the coil 4 or may increase electrical resistance due to a decrease in the cross-sectional area of the coil 4, while excessively low tension may cause the coil 4 to be deflected and make the regular winding difficult.

Therefore, in a coil winding machine for winding the coil 4, a winding nozzle for controlling the position of the coil 4 has to be appropriately positioned in a direction perpendicular to the side surface 12a of the tooth 12 with respect to a winding target position. For this purpose, spaces on both sides of the side surfaces 12a of the tooth 12 in the circumferential direction have to be opened.

Since each split surface 21 of the yoke 9 is arranged between the center of the first yoke part 10 in the circumferential direction and the center of the second yoke part 11 in the circumferential direction as described above, the spaces on both sides of the side surfaces 12a of the tooth 12 in the circumferential direction can be widely opened in the state where the stator core 1 is expanded in the band shape.

Incidentally, while the ultraviolet-curable adhesive agent is used for securing the coil 4 in the above explanation, the type of the adhesive agent is not limited to this example. For example, it is also possible to use an adhesive agent that is cured by heating, or an adhesive agent that is cured by a reaction of two types of liquids.

Figure 7A:
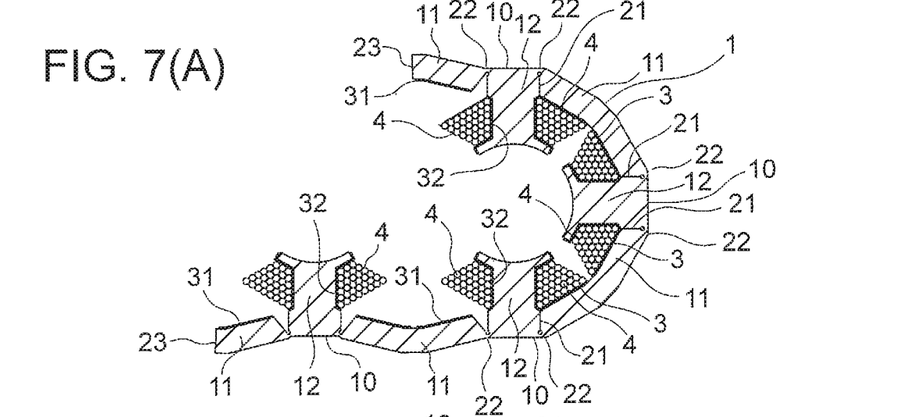
FIGS. 7(A), 7(B) and 7(C) are cross-sectional views for explaining the manufacturing process of the motor in the first embodiment.
Figure 7B:
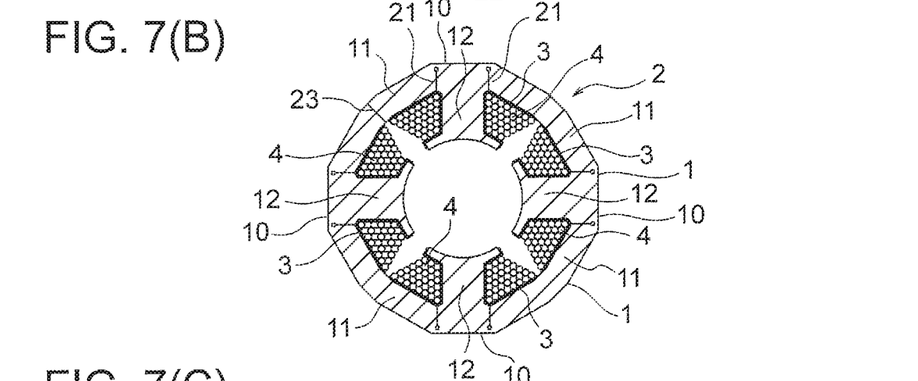
Figure 7C:
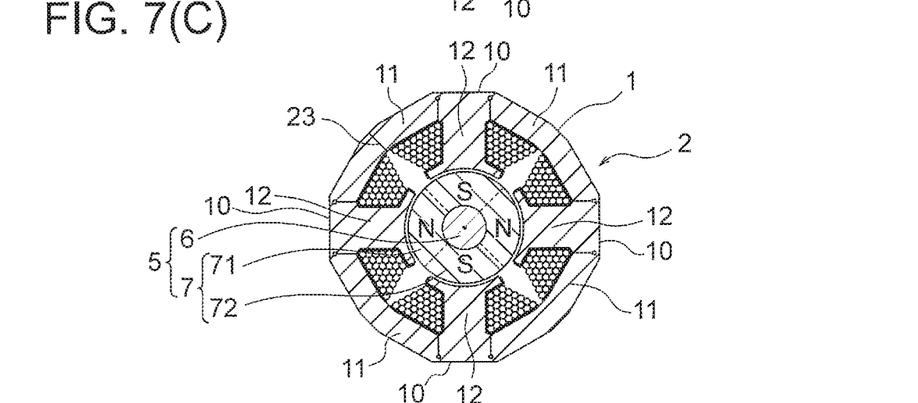

FIGS. 7(A), 7(B) and 7(C) are cross-sectional views for explaining a manufacturing process of the motor 100 after completion of the winding of the coil 4. After the winding of the coil 4 is completed, the stator core 1 expanded in the band shape is bent into the annular shape as shown in FIG. 7(A). Thus, each thin-wall part 22 between the first yoke part 10 and the second yoke part 11 adjacent to each other deforms plastically.

Subsequently, as shown in FIG. 7(B), the annular stator core 1 is formed by abutting the abutting parts (parts to become the joint surface 23) on both ends of the stator core 1 against each other and welding the abutting parts together to a predetermined depth in bead-like form or at some points. Accordingly, the stator 2 including the stator core 1, the insulator 3 and the coil 4 is obtained. Thereafter, the stator 2 is press-fitted into the first frame part 81 of the frame 80 shown in FIG. 1. Incidentally, the frame 80 (the first frame part 81) is omitted in FIG. 7.

On the other hand, in regard to the rotor 5, the permanent magnet 7 is attached to the shaft 6 and thereafter the bearings 85 and 86 (FIG. 1) are attached to the shaft 6. Then, the rotor 5 is inserted into inside of the stator core 1 of the stator 2 as shown in FIG. 7(C). Thereafter, the frame 80 (FIG. 1) is formed by attaching the second frame part 82 to the first frame part 81. Accordingly, the motor 100 is completed.

Incidentally, while the stator core 1 formed continuously via the thin-wall parts 22 is used in this example, it is also possible to form the split cores constituting the stator core 1 as members independent from each other, combine the split cores into the annular shape, and weld the split cores to each other.

Effects of Embodiment

As described above, in the first embodiment of the present invention, the yoke 9 of the stator core 1 includes the first yoke part 10 and the second yoke part 11, and the inner wall surface 11a of the second yoke part 11 extends from the end G in the circumferential direction of the root part of the tooth 12, and extends in a plane inward in the radial direction relative to the plane V passing through the end G and perpendicular to the center line C. With this configuration, the distance from the axis line Ax to the outer circumference of the stator core 1 (more specifically, the outer circumference of the second yoke part 11) can be reduced and the space for arranging the coil 4 can be provided. Namely, downsizing of the motor 100 can be achieved.

In addition, since the yoke 9 has the split surface 21 between the center of the first yoke part 10 in the circumferential direction and the center of the second yoke part 11 in the circumferential direction, the spaces on both sides of the side surfaces 12a of the tooth 12 in the circumferential direction can be widely opened in the state where the stator core 1 is expanded in the band shape. Accordingly, the winding work of the coil 4 using the coil winding machine can be carried out easily and accuracy.

Further, since the stator core 1 includes the four teeth 12 arranged at equal intervals in the circumferential direction, downsizing of a motor required to rotate at high speed, such as a motor for a fan of a vacuum cleaner can be achieved.

Further, since the coil 4 is fixed using the adhesive agent, the coil 4 wound around the tooth 12 can be held in a stable condition and stability of an operation of the motor 100 can be enhanced. Further, since the ultraviolet-curable adhesive agent is used as the adhesive agent, the process of curing the adhesive agent by ultraviolet irradiation can be repeated each time one layer of the coil 4 is wound. Accordingly, collapse of the coil 4 during the winding work can be prevented and the regular winding at high density becomes possible.

Further, when the distance H from the side surface 12a of the tooth 12 to the split surface 21 is greater than or equal to 0.5 times the diameter D of the coil 4, the first layer 41 of the coil 4 is inhibited from climbing over the inclined surface 15 of the tooth 12 in the winding process. In other words, the inclined surface 15 of the tooth 12 serves as a stopper for the first layer 41 of the coil 4, and thus the coil 4 can be wound around the tooth 12 at high density.

Further, when the distance H from the side surface 12a of the tooth 12 to the split surface 21 is too long, the second yoke parts 11 may enter the spaces on both sides of the side surfaces 12a of the tooth 12 in the circumferential direction in a state where the stator core 1 is expanded in the band shape and may interfere with the winding work. When the distance H is less than or equal to 1.5 times the diameter D of the coil 4, the second yoke parts 11 do not enter the spaces on both sides of the side surfaces 12a of the tooth 12 in the circumferential direction, and thus the winding work can be carried out smoothly.

Further, since the split surface 21 of the yoke 9 is formed at the boundary between the first yoke part 10 and the second yoke part 11, the configuration of each of the first yoke part 10 and the second yoke part 11 can be simplified.

Further, since the inclined surface 15 of the tooth 12 has an inclination such that its distance from the axis line Ax increases with increase in distance from the tooth 12 in the circumferential direction, the inclined surface 15 suitably functions as the stopper when the coil 4 is wound.

Further, since the plurality of layers of the coil 4 are wound so that the number of turns decreases with increase in distance from the tooth 12, the winding can be carried out in such a manner that the envelope of the wound coil 4 extends along the inner wall surface 11a of the second yoke part 11.

Further, since the outer wall surface 11b of the second yoke part 11 extends in parallel with the inner wall surface 11a of the second yoke part 11, the distance from the axis line Ax to the outer circumference (i.e., the outer wall surface 11b) of the second yoke part 11 of the stator core 1 can be reduced effectively.

First Modification

Figure 8:
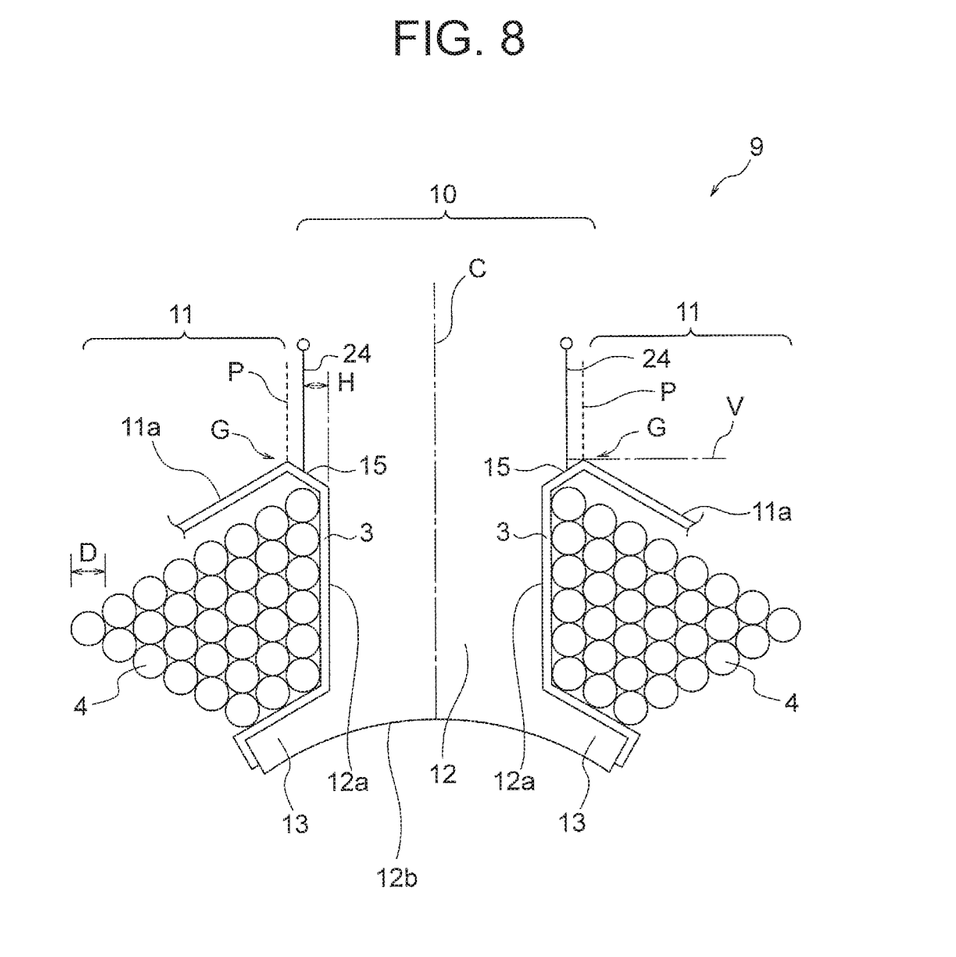
FIG. 8 is an enlarged view showing a part around a tooth in a stator in a first modification of the first embodiment.

FIG. 8 is an enlarged schematic view showing a part around a tooth 12 in a stator 2 in a first modification of the first embodiment. In the above described first embodiment, the split surface 21 of the yoke 9 is formed at the boundary between the first yoke part 10 and the second yoke part 11. In contrast, in this first modification, a split surface 24 of the yoke 9 is formed at a position shifted in the circumferential direction from a boundary (represented by reference character P) between the first yoke part 10 and the second yoke part 11.

In this example, the split surface 24 is formed in the first yoke part 10. The rest of the configuration is as described in the first embodiment. Specifically, the shape and arrangement of the inner wall surface 11a of the second yoke part 11 are the same as those in the first embodiment. Further, the distance H from the side surface 12a of the tooth 12 to the split surface 24 in the circumferential direction is desired to be within the range of 0.5 times to 1.5 times the diameter D of the coil 4.

Incidentally, while the split surface 24 is formed in the first yoke part 10 in the example shown in FIG. 8, it is also possible to form the split surface 24 in the second yoke part 11. Also in this case, the distance H from the side surface 12a of the tooth 12 to the split surface 24 in the circumferential direction is desired to be within the range of 0.5 times to 1.5 times the diameter D of the coil 4.

Also in this first modification, the distance from the axis line Ax to the outer circumference of the stator core 1 (more specifically, the outer circumference of the second yoke part 11) can be reduced similarly to the first embodiment. Further, by setting the distance H from the side surface 12a of the tooth 12 to the split surface 24 in the circumferential direction within the range of 0.5 times to 1.5 times the diameter D of the coil 4, the displacement of the coil 4 can be inhibited, and smooth winding work can be achieved by widely opening the spaces on both sides of the side surfaces 12a of the tooth 12 in the circumferential direction.

Second Modification

Figure 9:
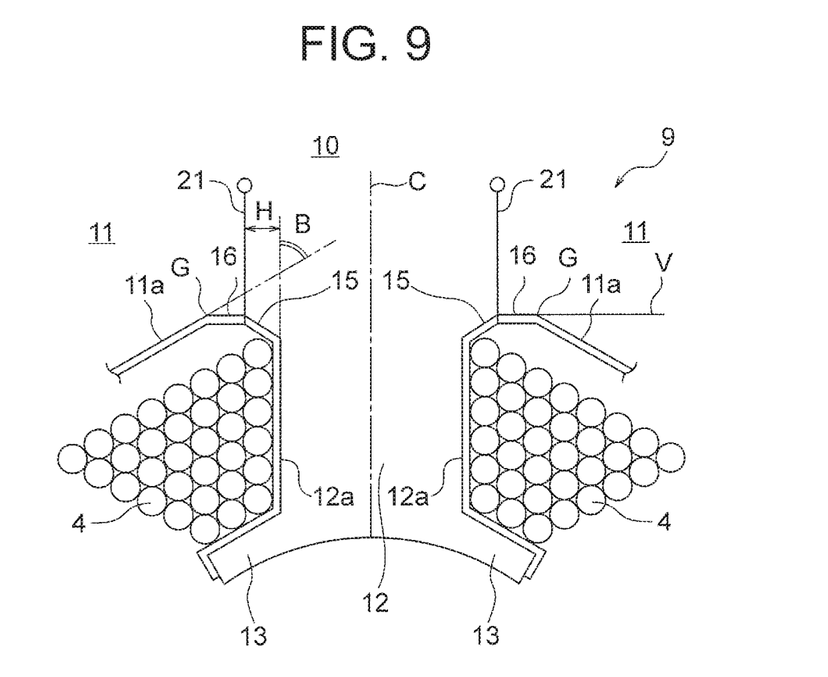
FIG. 9 is an enlarged view showing a part around a tooth in a stator in a second modification of the first embodiment.

FIG. 9 is an enlarged schematic view showing a part around a tooth 12 in a stator 2 in a second modification of the first embodiment. In the above described first embodiment, the inclined surface 15 (FIG. 4) of the tooth 12 and the inner wall surface 11a of the second yoke part 11 are adjacent to each other. In contrast, in this second modification, another inner wall surface 16 is formed between the inclined surface 15 of the tooth 12 and the inner wall surface 11a of the second yoke part 11.

The inclined surface 15 is configured as described in the first embodiment and serves as a stopper for the first layer of the coil 4 in the winding process. The another inner wall surface 16 extends further outward in the circumferential direction from an outer end of the inclined surface 15 in the circumferential direction.

The inner wall surface 11a of the second yoke part 11 is a flat surface extending from an outer end G of the inner wall surface 16 in the circumferential direction, and extending inward in the radial direction relative to a plane V passing through the end G and perpendicular to the center line C. Similarly to the first embodiment, the distance H from the side surface 12a of the tooth 12 to the split surface 21 in the circumferential direction is desired to be within the range of 0.5 times to 1.5 times the diameter D of the coil 4.

Also in this second modification, the distance from the axis line Ax to the outer circumference of the stator core 1 (more specifically, the outer circumference of the second yoke part 11) can be reduced similarly to the first embodiment. Further, the displacement of the coil 4 can be inhibited, and smooth winding work can be achieved by widely opening the spaces on both sides of the side surfaces 12a of the tooth 12 in the circumferential direction.

Third Modification

Figure 10:
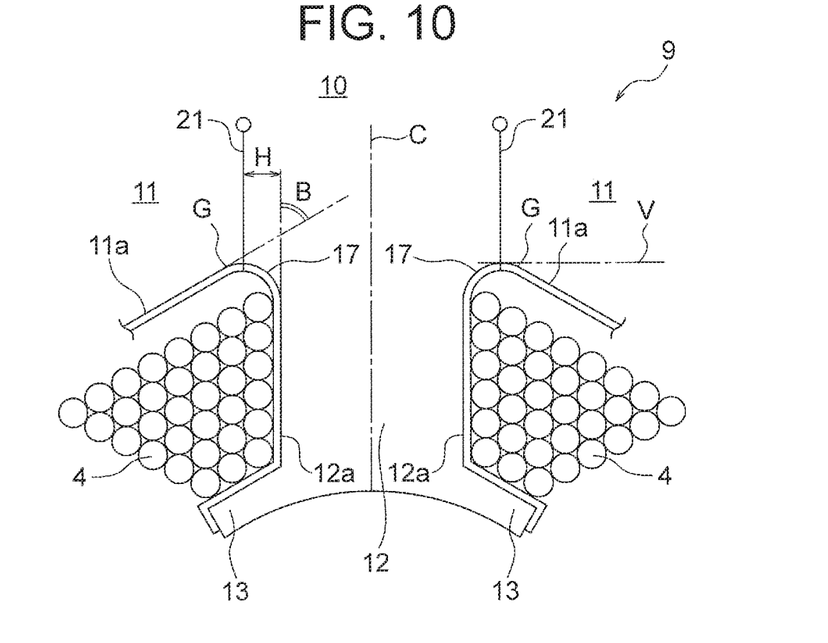
FIG. 10 is an enlarged view showing a part around a tooth in a stator in a third modification of the first embodiment.

FIG. 10 is an enlarged schematic view showing a part around a tooth 12 in a stator 2 in a third modification of the first embodiment. In the above described first embodiment, the first yoke part 10 has the planar inclined surface 15 (FIG. 4). The first yoke part 10 in this third modification has a curved surface 17 instead of the planar inclined surface 15.

The curved surface 17 is curved so that its distance from the axis line Ax increases with increase in distance from the side surface 12a of the tooth 12 in the circumferential direction. Accordingly, the curved surface 17 functions as a stopper (a contact surface) for the first layer of the coil 4 in the winding process.

The inner wall surface 11a of the second yoke part 11 is a flat surface extending from an outer end G of the curved surface 17 in the circumferential direction, and extending inward in the radial direction relative to a plane V passing through the end G and perpendicular to the center line C. Similarly to the first embodiment, the distance H from the side surface 12a of the tooth 12 to the split surface 21 in the circumferential direction is desired to be within the range of 0.5 times to 1.5 times the diameter D of the coil 4.

Also in this third modification, the distance from the axis line Ax to the outer circumference of the second yoke part 11 can be reduced similarly to the first embodiment. Further, the displacement of the coil 4 can be inhibited, and smooth winding work can be achieved by widely opening the spaces on both sides of the tooth 12 in the circumferential direction.

(Fan)

Figure 11:
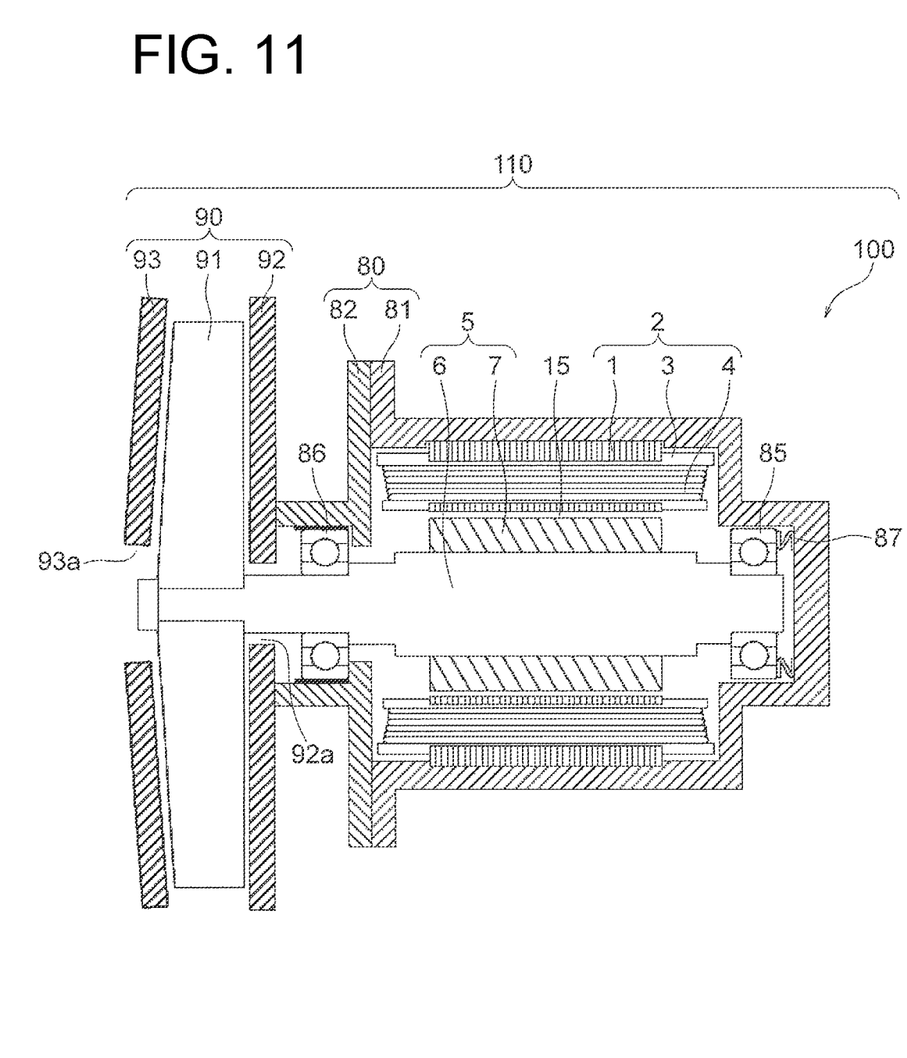
FIG. 11 is a cross-sectional view showing a configuration of a fan to which the motor in the first embodiment is applied.

Next, a fan 110 to which the motor in the first embodiment or each modification described above is applied will be described. FIG. 11 is a sectional view showing the fan 110 to which the motor in the first embodiment or each modification is applied. The fan 110 is employed for a vacuum cleaner 200 (FIG. 12), for example.

The fan 110 includes a blower unit 90 mounted on the second frame part 82 of the motor 100. The blower unit 90 includes a main plate 92 having a through hole 92a allowing the shaft 6 to penetrate, an impeller 91 attached to the tip end of the shaft 6 penetrating the through hole 92a of the main plate 92, and a fan cover 93 covering the impeller 91 from outside.

An air intake port 93a is formed at a center of the fan cover 93. A channel (air channel) for air flowing in through the air intake port 93a is formed between the main plate 92 and the fan cover 93.

When the rotor 5 of the motor 100 rotates, the impeller 91 attached to the shaft 6 of the rotor 5 rotates. When the impeller 91 rotates, air flows in through the air intake port 93a, flows in the air channel between the main plate 92 and the fan cover 93 toward an outer circumferential side, and is discharged through an air outlet (not shown) formed on the outer circumferential side.

The motor 100 in the first embodiment or each modification described above is capable of reducing the distance from the center to the outer circumference of the stator core 1. Thus, by applying this motor 100 to the fan 110, a discharge air channel from the blower unit 90 can be formed on an outer side of the motor 100 and an outer diameter of the fan 110 can be reduced.

(Vacuum Cleaner)

Figure 12:
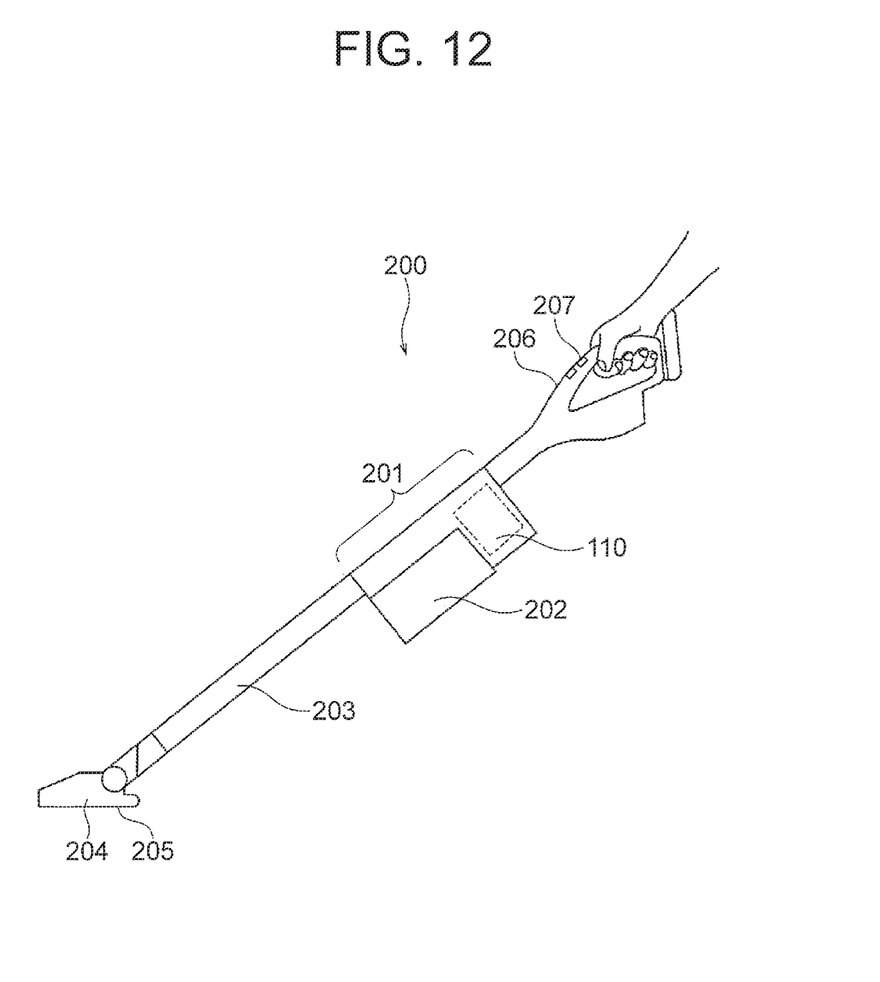
FIG. 12 is a schematic view showing a configuration of a vacuum cleaner including the fan of FIG. 11.

Next, a vacuum cleaner 200 including the fan 110 to which the motor in the first embodiment or each modification described above is applied will be described. FIG. 12 is a schematic diagram showing the vacuum cleaner 200 including the fan 110 to which the motor in the first embodiment or each modification is applied.

The vacuum cleaner 200 includes a cleaner main body 201, a pipe 203 connected to the cleaner main body 201, and a suction part 204 connected to a tip end part of the pipe 203. The suction part 204 is provided with a suction port 205 for sucking in air containing dust. A dust collection container 202 is arranged in the cleaner main body 201.

Further, the fan 110 for sucking in air containing dust from the suction part 204 to the dust collection container 202 is arranged in the cleaner main body 201. The cleaner main body 201 is provided with a grip part 206 to be gripped by a user, and the grip part 206 is provided with an operation part 207 such as an on/off switch.

When the user grips the grip part 206 and operates the operation part 207, the fan 110 is driven. When the fan 110 is driven, suction wind occurs and dust is sucked in together with air via the suction port 205 and the pipe 203. The dust sucked in is stored in the dust collection container 202.

Since this vacuum cleaner 200 employs the small-sized fan 110 described above, downsizing of the vacuum cleaner 200 becomes possible.

While the preferred embodiments of the present invention have been described specifically above, the present invention is not limited to the above described embodiments and a variety of improvements or modifications are possible within the range not departing from the subject matter of the present invention.

What is claimed is:

1. A stator comprising:
   a yoke extending in a circumferential direction about an axis line;
   a tooth extending from the yoke in a first direction toward the axis line; and
   a coil wound around and fixed to the tooth,
   wherein the yoke has an inner wall surface facing the axis line;
   wherein the tooth has a root part connected to the yoke;
   wherein the inner wall surface of the yoke is a flat surface extending from an end of the root part of the tooth in the circumferential direction to an inner circumferential side relative to a plane passing through the end and perpendicular to the first direction;
   wherein the yoke has a split surface formed so as to pass through the end of the root part of the tooth in the circumferential direction;
   wherein the tooth has a winding part around which the coil is wound; and
   wherein a distance from an end of the winding part of the tooth in the circumferential direction to the split surface is greater than or equal to 0.5 times a diameter of the coil and less than or equal to 1.5 times the diameter of the coil.

2. The stator according to claim 1, comprising four teeth including the tooth and arranged at equal intervals in the circumferential direction.

3. The stator according to claim 1, further comprising an adhesive agent with which the coil is fixed to the tooth.

4. The stator according to claim 3, wherein the adhesive agent is an ultraviolet-curable adhesive agent.

5. The stator according to claim 1, wherein the root part of the tooth has a contact surface that contacts the coil wound around the tooth.

6. The stator according to claim 1, wherein the coil has a plurality of layers that are wound so that a number of turns decreases with increase in distance from the tooth.

7. The stator according to claim 1, wherein the yoke has an outer wall surface extending in parallel with the inner wall surface.

8. A motor comprising
   a rotor and
   a stator provided around the rotor,
   wherein the stator comprises:
      a yoke extending in a circumferential direction about an axis line;
      a tooth extending from the yoke in a first direction toward the axis line; and
      a coil wound around and fixed to the tooth,
   wherein the yoke has an inner wall surface facing the axis line;
   wherein the tooth has a root part connected to the yoke;
   wherein the inner wall surface of the yoke is a flat surface extending from an end of the root part of the tooth in the circumferential direction to an inner circumferential side relative to a plane passing through the end and perpendicular to the first direction;
   wherein the yoke has a split surface formed so as to pass through the end of the root part of the tooth in the circumferential direction;
   wherein the tooth has a winding part around which the coil is wound; and
   wherein a distance from an end of the winding part of the tooth in the circumferential direction to the split surface is greater than or equal to 0.5 times a diameter of the coil and less than or equal to 1.5 times the diameter of the coil.

9. A fan comprising
   the motor according to claim 8 and
   an impeller rotated by the motor.

10. A vacuum cleaner comprising
    a suction part having a suction port,
    a dust collection container to store dust, and
    a fan to suck in air containing dust from the suction part to the dust collection container,
    wherein the fan comprises the motor according to claim 8 and an impeller rotated by the motor.

* * * * *